Sept. 29, 1959 C. M. MOORE Re. 24,705
COMBINATION BY-PASS AND DISCONNECT DEVICE
FOR RINGLESS SOCKET BLOCK ASSEMBLY
Original Filed Jan. 13, 1956 2 Sheets-Sheet 1
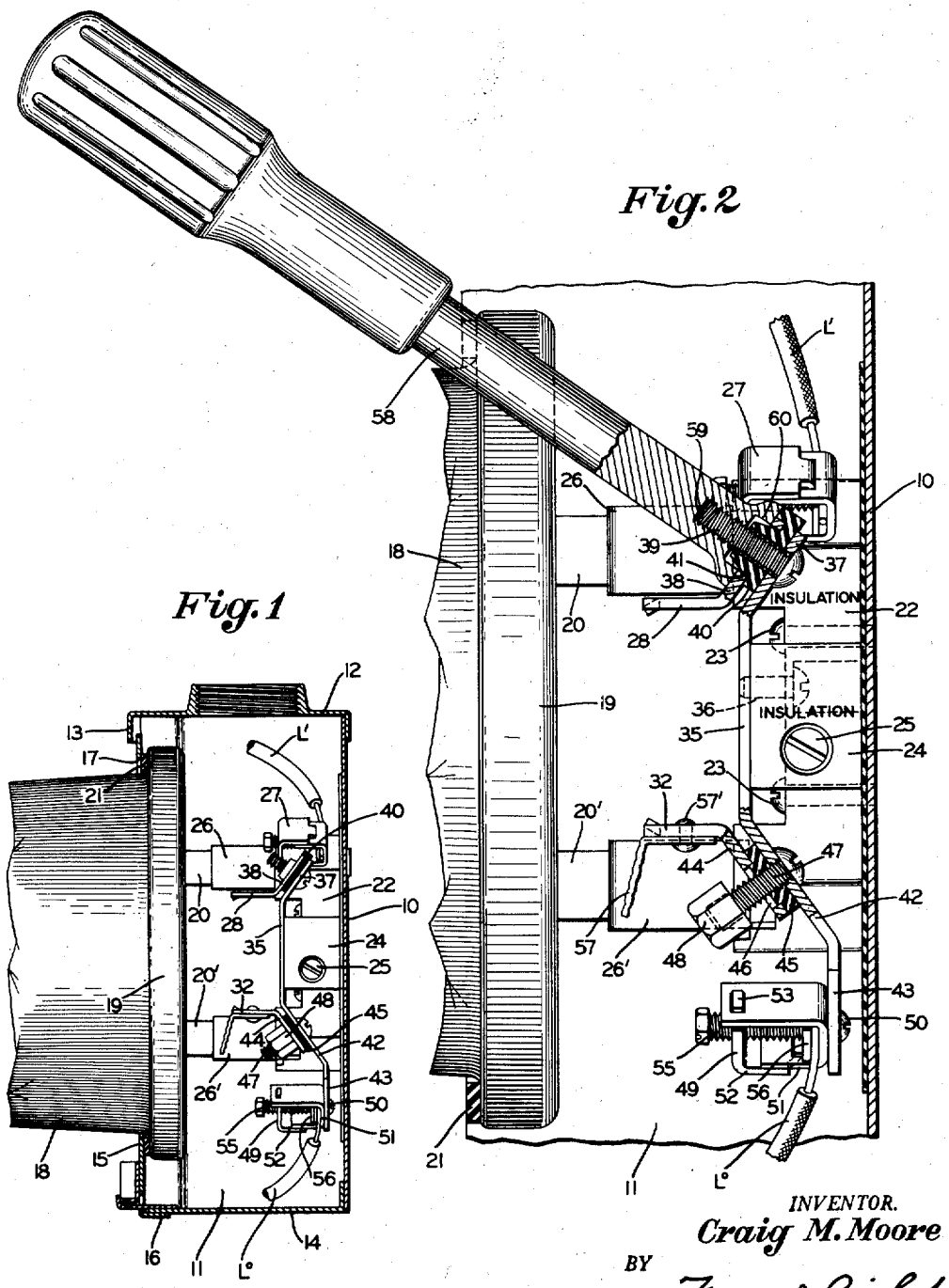
INVENTOR.
Craig M. Moore
BY
Frease & Bishop
ATTORNEYS Sept. 29, 1959 C. M. MOORE Re. 24,705

COMBINATION BY-PASS AND DISCONNECT DEVICE
FOR RINGLESS SOCKET BLOCK ASSEMBLY

Original Filed Jan. 13, 1956 2 Sheets-Sheet 2

INVENTOR.
Craig M. Moore

BY
Frease & Bishop
ATTORNEYS

United States Patent Office

Re. 24,705
Reissued Sept. 29, 1959

24,705

COMBINATION BY-PASS AND DISCONNECT DEVICE FOR RINGLESS SOCKET BLOCK ASSEMBLY

Craig M. Moore, North Canton, Ohio, assignor to The Superior Switchboard & Devices Co., Canton, Ohio, a corporation of Ohio Original No. 2,825,879, dated March 4, 1958, Serial No. 558,887, January 13, 1956. Application for reissue October 30, 1958, Serial No. 770,875

14 Claims. (Cl. 339—19)

Matter enclosed in heavy brackets [ ] appears in the original patent but forms no part of this reissue specification; matter printed in italics indicates the additions made by reissue.

The invention relates to ringless socket block assemblies and more particularly to a combined by-pass and disconnect device for such assemblies whereby a watt-hour meter or the like may be tested without disturbing any of the present connections, and having means whereby the meter may be removed for testing without disturbing the customer's load.

Socket type meter enclosures such as have been in general use for many years, comprise generally a metal box having terminal jaws therein, mounted upon insulation blocks, for receiving the terminal posts or blades of the meter, and a detachable closure or cover for the box or enclosure having a circular opening for mounting the meter. An integral flanged ring surrounds the circular opening in the cover, the base of the meter seating upon said flanged ring and being secured thereto by a channel cross section sealing ring. In such enclosures it was necessary to remove the meter from the socket before the cover could be removed from the box.

More recently, ringless socket meter enclosures have been produced in which the cover is provided with a ringless opening of sufficient diameter to receive the meter, whereby the cover may be removed from the box without disconnecting and removing the meter. The present invention is particularly applicable to this latter type of meter enclosures.

It is therefore an object of the invention to provide a combined by-pass and disconnect device for ringless socket block assemblies, whereby a meter may be tested without disturbing any of the connections in the box, and whereby current may be by-passed around the terminal jaws so that the meter may be removed from the box, so as not to disturb the customer's load.

Another object is to provide a ringless socket block assembly comprising two spaced pairs of jaws for receiving the terminal blades of a meter, line wires connected to one jaw of each pair and load wires normally connected to the other jaw of each pair, and means for disconnecting said other jaws from the load wires and for connecting the line wires to the load wires.

*Another object of the invention is to provide such a ringless socket block assembly in which the by-pass device may be operated to by-pass current around the meter from the line wires to the load wires without operating the disconnect device.*

A further object is to provide such a block assembly comprising two spaced pairs of terminal jaws adapted to receive the terminal posts or blades of the meter, a line wire being directly connected to one jaw of each pair, a load strap being detachably connected to the other jaw of each pair, and a by-pass device for connecting the first-mentioned jaw of each pair to the load strap.

A still further object is to provide a block assembly of the character referred to in which one jaw of each pair is adapted to be detachably connected to the load strap through a by-pass link, and the other jaw of each pair is normally detachably connected to the load strap through a disconnect link.

*It is also an object of the invention to provide a ringless socket block assembly in which one contact jaw of each pair is connected to a line wire and in which the other contact jaw of each pair is connected to a load wire and to a load strap, the load straps being normally disconnected from the first-mentioned jaw of each pair, and in which wrenches are provided for detachably connecting the load straps to the first-mentioned jaws for by-passing current around the meter through the load straps from the line wires to the load wires.*

Another object of the invention is to provide such a block assembly in which connection between the by-pass link and the load strap is made by a special internally threaded wrench engaging an insulated by-pass screw.

A further object is to provide a block assembly of this type in which the other jaw of each pair is disconnected from the load strap by backing off a disconnect nut from an insulated disconnect screw.

The above and other objects, apparent from the drawings and following description, may be attained, the above described difficulties overcome and the advantages and results obtained, by the apparatus, construction, arrangement and combinations, subcombinations and parts which comprise the present invention, a preferred embodiment of which, illustrative of the best mode in which applicant has contemplated applying the principle, being set forth in detail in the following description and illustrated in the accompanying drawings.

In general terms, the invention may be described briefly as comprising a pair of similar socket block assemblies mounted in a socket type meter box having a removable cover provided with an opening to receive the meter, whereby the cover may be placed over the meter and mounted upon the box after the meter is mounted in the socket block assemblies.

The two socket block assemblies are of similar construction, each comprising an insulation block attached to the back or bottom of the box; a spaced pair of contact jaws is mounted upon each block for receiving the terminal posts or blades of a meter, one jaw of each pair being directly connected to a line wire terminal connection.

A load strap of suitable conducting material is attached to each block at one side of the spaced pair of contact jaws and is directly connected at one end to a load wire terminal connection.

A disconnect link is attached to the adjacent contact jaw and adapted to be normally detachably connected to this end portion of the load strap by means of a disconnect screw and nut, a disconnect insulator being interposed between the load strap and the disconnect link.

A by-pass link is attached to the other contact jaw of each pair and is normally insulated from that end portion of the load strap by a by-pass insulator. A by-pass screw is carried by the adjacent end of the load strap and located through the by-pass insulator, and the by-pass link is adapted to be electrically connected to the load strap when it is desired to by-pass the meter.

This may be accomplished by a special wrench having a threaded socket for engagement with the by-pass screw and a portion for contact with the by-pass link. Conventional test ears, for the attachment of meter test connections are mounted upon the disconnect links of the two block assemblies.

When it is desired to by-pass the meter in order that the meter may be tested without disturbing the customer's load, the special wrench is engaged with the by-pass screw and contacts the by-pass link, and the disconnect nut is backed off of the disconnect screw, thus cutting the meter out of the circuit and passing the current from the line terminal connection through the by-pass link and by-pass screw to the load strap and thence through the load terminal connection thereon to the customer's load.

Having thus briefly described the invention, reference is now made to the accompanying drawings showing a preferred embodiment of the invention, in which:

Fig. 1 is a vertical sectional view through a ringless socket meter box provided with the improved combination by-pass and disconnect device, showing a meter mounted therein and the cover of the box in closed position;

Fig. 2 is an enlarged side elevation of the combined by-pass and disconnect device, showing the special wrench engaging the by-pass screw and contacting the by-pass link, and the disconnect nut backed off of the disconnect screw;

Figure 3:
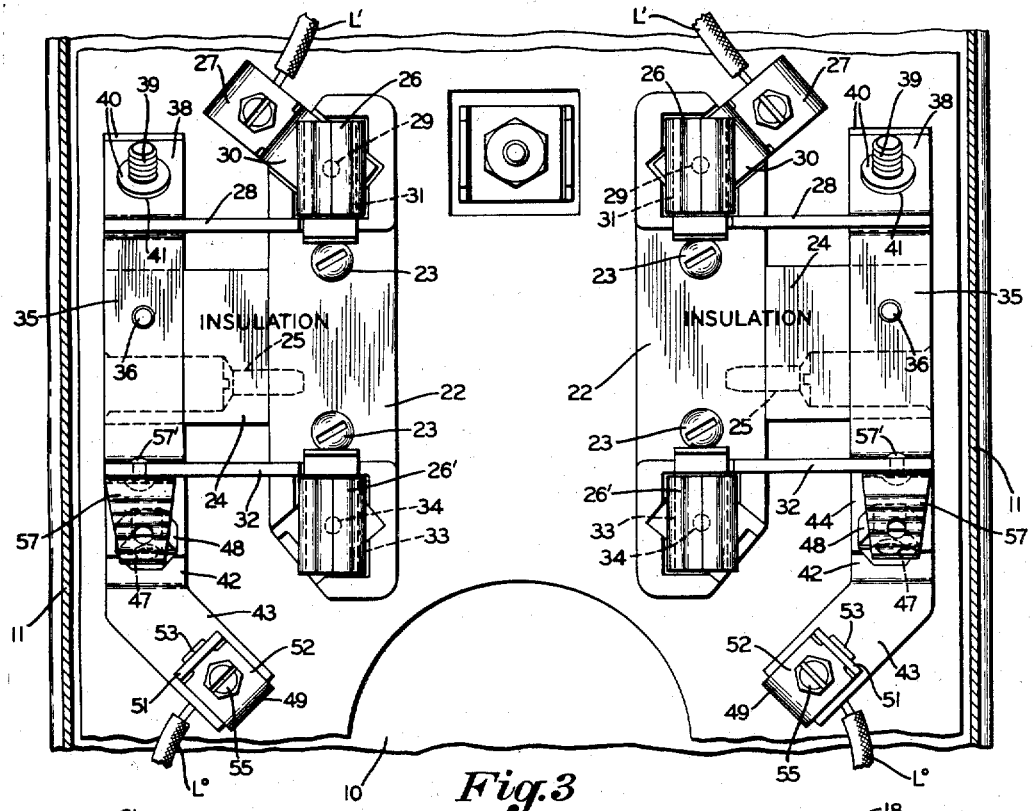
Fig. 3 is a front elevation of the by-pass and disconnect block assembly.

The device is adapted to be located within a socket meter enclosure with ringless cover or closure member such as shown in Fig. 1. The enclosure or box is formed of sheet metal comprising the back wall 10, side walls 11, top wall 12 with depending flange 13 at its front end, and bottom wall 14.

The cover or closure member 15 may also be of sheet metal having the rearwardly disposed flanges 16 at its bottom and side edges, the upper end thereof being inserted behind the depending flange 13 of the box when the cover is in closed position, while the rearwardly disposed flanges 16 of the cover engage over the bottom wall 14 and side walls 11 of the box.

A substantially central, circular opening 17 is formed in the cover adapted to receive the conventional glass case or housing 18 of the meter. The meter may be of conventional construction, such as the usual watt-hour meter or the like, and, through the base portion 19 thereof, the usual terminal posts or blades 20 and 20' project rearwardly therefrom as in usual practice.

A rubber gasket 21 is provided on the front side of the [motor] *meter* base 19, surrounding the glass case 18 of the meter, for sealing contact with the rear surface of the cover 15 adjacent to the circular opening 17 therein.

The combined by-pass and disconnect device to which the invention pertains is incorporated in a pair of similar socket block assemblies, each of which is mounted upon an insulation block 22 attached to the back wall of the box as by the screws 23. A smaller insulation block 24, for mounting the load strap as will be later described, is attached to the outer side of each block 22 as by the screw 25.

The insulation blocks 22 are located vertically within the meter box or enclosure, and are mounted in spaced, parallel relation as best shown in Fig. 3. A contact jaw 26 is mounted upon the upper portion of each block 22 in electrical contact with a line wire connection 27 and a by-pass link 28. These three members are rigidly connected to the block 22 by a single screw 29.

These contact jaws 26 as well as the contact jaws 26', mounted upon the lower portion of each block 22, are of conventional construction. The jaw 26 rests upon the top of the angular flange 30 of the line wire connection 27, and the angular flange 31 of the by-pass link 28 is clamped against the bottom portion of the jaw 26 by the screw 29.

Figure 4:
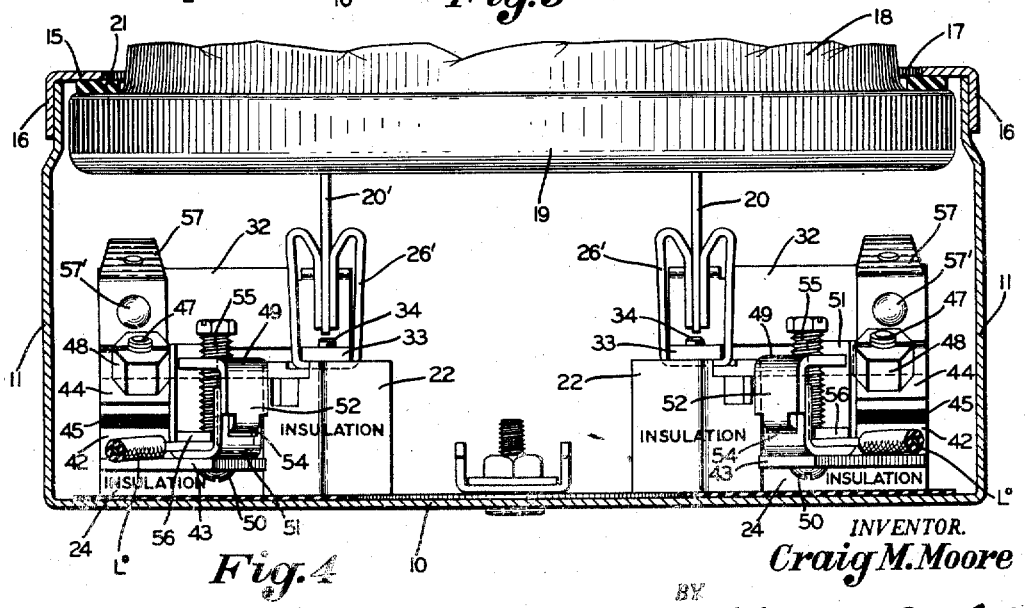
Fig. 4 is an end elevation of the same.

A disconnect link 32, similar to the by-pass link 28, is connected to the lower contact jaw 26' on each block, the disconnect link 32 having an annular flange 33 clamped upon the top of the bottom portion of the jaw 26', as best shown in Fig. 4, by the screw 34 which connects the jaw 26' to the block 22.

A load strap 35 is mounted upon the insulation block 24 as by the screw 36. This load strap is in the form of a flat metal bar of suitable electric conductive material, and, as best shown in Fig. 3, is located at one side of and parallel to the contact jaws 26—26'.

The upper end of the load strap 35 is preferably angled rearwardly, as indicated at 37. The by-pass link 28 has a rearwardly angled flange 38 at its outer end, spaced from and parallel to the angular upper end 37 of the load strap.

The by-pass screw 39 is attached to the angular upper end portion 37 of the load strap and is located through the by-pass insulator 40, interposed between the angular flange 38 of the by-pass link and angular upper end 37 of the load strap, and is located through the opening 41 in the angular flange 38 and extends forwardly thereof, as best shown in Fig. 2.

It will thus be obvious that current from the line terminals 27 does not normally pass through the by-pass link 28 to the load strap 35. The lower end of the load strap 35 is angled downwardly and rearwardly, as shown at 42, and terminates in the vertical portion 43, which may be angled toward the interior of the box as best shown in Fig. 3.

The disconnect link 32 has a rearwardly and downwardly angled flange 44 at its outer end, which is spaced from and parallel to the angular portion 42 of the load strap. An insulator 45 is interposed between the angular flange 44 and the angular portion 42 of the load bar and extends through the opening 46 in the flange 44.

A disconnect screw 47 is connected to the angular portion 42 of the load bar and is located through the insulator 45, a disconnect nut 48 being mounted upon the screw and contacting the flange 44 of the disconnect link 32. The lower contact jaw 26' is thus normally electrically connected to the load strap 35 when the disconnect nut 48 is tightened upon the disconnect screw 47, as shown in Fig. 1.

A load wire connection 49 is fixed to the lower end portion 43 of the load strap as by the screw 50. The load wire connections 49 and the line wire connections 27 may be of any suitable type, preferably of the lay-in connector construction shown in copending application of Raymond T. Trier, Serial No. 415,631, filed March 11, 1954, now Patent No. 2,774,953 issued December 18, 1956.

Each of these connections comprises the U-shaped base member 51, attached to the lower end of the load bar by the screw 50, and the angle cap member 52, detachably connected thereto as by the lugs 53 and 54 detachably engaged in suitable apertures in the U-shaped base member.

A binding screw 55 is threaded through the cap member 52 and has a clamping plate 56 swiveled upon its end for clamping the wire against the bottom of the U-shaped base member 51.

From the above it will be obvious that when the meter is positioned in the box with the terminal plates 20 thereof in the position shown in Fig. 1, current will pass from the line wires L' through the connections 27, contact jaws 26 and upper meter terminal blades 20 to the meter, and from the meter through the lower terminal blades 20', contact jaws 26', disconnect links 32, disconnect nuts 48 and screws 47 to the load straps 35 and through the load connections 49 to the customer's load wires L°.

For the purpose of testing the meter while it is mounted in the box, conventional test ears 57 may be connected to the disconnect links 32 as by rivets 57'. When it is desired to test the meter without removing it from the box, the cover 15 is removed without disturbing the meter connection.

Access may thus be had to the interior of the box so that the customer's load may be removed by backing off the disconnect nut 48, then test connections or clips may be attached to the test ears 57 and the meter may thus be tested without disturbing any of the present connections so as to comply with the laws of certain states.

In order to test the meter without disturbing the customer's load, a special wrench, such as indicated at 58 in Fig. 2 is used. This wrench has a screw threaded socket 59 adapted to engage the by-pass screw 39 and an enlarged, unthreaded socket portion 60 adapted to contact the angular flange 38 of the by-pass link 28.

At the same time, the disconnect nut 48 is backed off of the disconnect screw 47 as shown in Fig. 2. Thus the circuit from the line wires L′ is by-passed around the meter through the line wire connections 27, upper contact jaws 26, by-pass links 28, special wrench 58, by-pass screws 39, load straps 35 and load wire connections 49 to the load wires L°.

At the same time, the circuit from the line wires through the meter to the load wires is broken between the disconnect links 32 and the load straps 35. The customer's load is thus not disturbed while at the same time the circuit from the line wires L′ is passed through the meter to the test ears 57, so that the meter may be tested without removing it from the box. In the same manner, if it is necessary or desirable to remove the meter from the box, the customer's load remains unbroken.

*It should be understood that the by-pass device may be operated without operating the disconnect device. This may be done by applying the wrenches 58 in the manner shown in Fig. 2, so as to detachably connect the by-pass links 28 to the load straps 35, and leaving the disconnect nuts 48 in the connected position also shown in Fig. 2.*

*The meter 18 may then be removed from the box without disturbing the customer's load, as the current will then be by-passed from the line wires L′, line wire connections 27, by-pass links 28, load straps 35 and load wire connections 49 to the load wires L°.*

*The disconnect device is operated to disconnect the disconnect links 32 from the load straps 35, by backing off the disconnect nuts 48, only in cases where it is desirable to test the meter without removing it from the box.*

*Thus with the by-pass device in connected position and the disconnect device in disconnected position, as above described, the customer's load is not disturbed and the meter may be tested in the box by attaching conventional test clips to the test ears 57.*

In the foregoing description, certain terms have been used for brevity, clearness and understanding, but no unnecessary limitations are to be implied therefrom beyond the requirements of the prior art, because such words are used for descriptive puposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful construction, and reasonable mechanical equivalents thereof obvious to those skilled in the art, are set forth in the appended claims.

I claim:

1. A socket block assembly having a combined by-pass and disconnect device for a socket type meter, comprising spaced pairs of contact jaws for receiving the meter terminal posts, means connecting a line wire to one contact jaw of each pair, a load strap adjacent to each pair of contact jaws, means normally connecting the other contact jaw of each pair to the corresponding load strap, means connecting a load wire to each load strap, and detachable means for connecting each of said one contact jaws to the corresponding load strap, so as to by-pass current around the meter and through the load straps when said second named means is operated to disconnect said other contact jaws from the corresponding load straps.

2. A socket block assembly having a combined by-pass and disconnect device for a socket type meter, comprising spaced pairs of contact jaws for receiving the meter terminal posts, means connecting a line wire to one contact jaw of each pair, a load strap adjacent to each pair of contact jaws, means normally connecting the other contact jaw of each pair to the corresponding load strap, means connecting a load wire to each load strap, detachable means for connecting each of said one contact jaws to the corresponding load strap, so as to by-pass current around the meter and through the load straps when said second named means is operated to disconnect said other contact jaws from the corresponding load straps, and a test ear connected to each of said other contact jaws.

3. A socket block assembly having a combined by-pass and disconnect device for a socket type meter, comprising spaced pairs of contact jaws for receiving the meter terminal posts, means connecting a line wire to one contact jaw of each pair, a lead strap adjacent to each pair of contact jaws, a by-pass link connected to each of said one contact jaws and normally disconnected from the load strap, a corresponding load wire connected to each load strap, a disconnect link normally connecting the other contact jaw of each pair to the corresponding load strap means for disconnecting the disconnect links from the corresponding load straps, and detachable means for connecting the by-pass links to the corresponding load straps, so as to by-pass current around the meter and through the load strap.

4. A socket block assembly having a combined by-pass and disconnect device for a socket type meter, comprising spaced pairs of contact jaws for receiving the meter terminal posts, a line wire connection attached to one contact jaw of each pair, a load strap adjacent to each pair of contact jaws, a load wire connection attached to each load strap, a by-pass link connected to each of said one contact jaws and normally disconnected from the load strap, an insulator interposed between each by-pass link and the corresponding load strap, a by-pass screw attached to each load strap and located through the corresponding insulator, a disconnect link connected to the other contact jaw of each pair, a disconnect insulator interposed between each disconnect link and the corresponding load strap, a disconnect screw attached to each load strap and located through the corresponding disconnect insulator, a disconnect nut upon each disconnect screw and normally contacting the corresponding disconnect link, and detachable means for engaging said by-pass screws and contacting said by-pass links, whereby said disconnect nuts may be backed off of said disconnect screws so as to by-pass current around the meter and through said load straps.

5. A socket block assembly having a combined by-pass and disconnect device for a socket type meter, comprising spaced pairs of contact jaws for receiving the meter terminal posts, a line wire connection attached to one contact jaw of each pair, a load strap adjacent to each pair of contact jaws, a load wire connection attached to each load strap, a by-pass link attached to each of said one contact jaws and disposed toward the corresponding load strap, a by-pass insulator interposed between each by-pass link and the corresponding load strap, a by-pass screw attached to each load strap and located through the corresponding insulator, a disconnect link attached to the other contact jaw of each pair and disposed toward the corresponding load strap, a disconnect insulator interposed between each load strap and the corresponding disconnect link, a disconnect screw attached to each load strap and located through the corresponding disconnect insulator, a disconnect nut upon each disconnect screw and normally contacting the corresponding disconnect link, and a tool having a threaded socket for engaging each by-pass screw and a portion for simultaneously contacting the corresponding by-pass link, whereby said disconnect nuts may be backed off of said disconnect screws so as to by-pass current around the meter and through said load straps.

6. A socket block assembly having a combined by-pass and disconnect device for a socket type meter, comprising spaced pairs of contact jaws for receiving the meter terminal posts, a line wire connection attached to one contact jaw of each pair, a load strap adjacent to each pair of contact jaws, opposite ends of said load straps being angularly disposed, a by-pass link attached to each of said one contact jaws and having an angular flange disposed toward one angular end of the corresponding load strap, a by-pass insulator interposed between said angular flange of each by-pass link and said one angular end of the corresponding strap, a by-pass screw attached to said one angular end of each load strap and located through the corresponding by-pass insulator, a disconnect link attached to the other contact jaw of each pair and having an angular flange disposed toward the other angular end of the corresponding load strap, a disconnect insulator interposed between the angular flange of each disconnect link and said other angular end of the corresponding load strap, a disconnect screw attached to said other angular end of each load strap and located through the corresponding disconnect insulator and normally contacting the corresponding disconnect link, a load wire connection attached to said other angular end of each load strap, and a tool having a threaded socket for engaging each by-pass screw and a portion for simultaneously contacting the angular flange of the corresponding by-pass link, whereby said disconnect nuts may be backed off of said disconnect screws so as to by-pass current around the meter and through said load straps.

7. A socket block assembly having a combined by-pass and disconnect device for a socket type meter, comprising two spaced pairs of contact jaws for receiving the meter terminal posts, a line wire connected to one contact jaw of each pair, a load strap adjacent to each pair of contact jaws, a by-pass link connected to each of said one contact jaws, a by-pass insulator located between each by-pass link and one end of the corresponding load strap, an electrical conducting metallic by-pass screw attached to said one end of each load strap and located through and extending beyond the corresponding by-pass insulator and insulated thereby from the corresponding by-pass link, a load wire connected to the other end of each load strap, a disconnect link connected to the other contact jaw of each pair, a disconnect insulator located between each disconnect link at said other end of the corresponding load straps, an electrical conducting metallic disconnect screw attached to said other end of each load strap and located through and extending beyond the corresponding disconnect insulator and insulated thereby from the corresponding disconnect link, a disconnect nut upon each disconnect screw and normally contacting the corresponding disconnect link, and a tool having a threaded socket for engaging each by-pass screw and a portion for simultaneously contacting the corresponding by-pass link, whereby said disconnect nuts may be backed off of said disconnect screws so as to by-pass current around the meter and through said load straps.

*8. In a ringless socket-block assembly for a socket-type meter, said socket-block assembly comprising spaced pairs of contact jaws for receiving the meter terminal posts, means connecting a line wire to one contact jaw of each pair and means connecting a load wire to the other contact jaw of each pair, a by-pass device comprising a load strap adjacent each pair of contact jaws, each load strap being normally disconnected from said one contact jaw of the corresponding pair, means connecting each load strap to one of the load wires, and detachable means for connecting each of said one contact jaws to the corresponding load strap so as to by-pass current through the load straps from the line wires to the load wires.*

*9. In a ringless socket-block assembly for a socket-type meter, said socket-block assembly comprising spaced pairs of contact jaws for receiving the meter terminal posts, means connecting a line wire to one contact jaw of each pair and means connecting a load wire to the other contact jaw of each pair, a by-pass device comprising a load strap adjacent each pair of contact jaws, each load strap being normally disconnected from said one contact jaw of the corresponding pair, means connecting each load strap to one of the load wires, and detachable wrenches for connecting each of said one contact jaws to the corresponding load strap so as to by-pass current through the load straps from the line wires to the load wires.*

*10. In a ringless socket-block assembly for a socket-type meter, said socket-block assembly comprising spaced pairs of contact jaws for receiving the meter terminal posts, means connecting a line wire to one contact jaw of each pair and means connecting a load wire to the other contact jaw of each pair, a by-pass device comprising a load strap adjacent each pair of contact jaws, a by-pass link connected to each of said one contact jaws and normally disconnected from the load straps, means connecting each load strap to one of the load wires, and detachable means for connecting each of said by-pass links to the corresponding load strap so as to by-pass current through the by-pass links and load straps from the line wires to the load wires.*

*11. In a ringless socket-block assembly for a socket-type meter, said socket-block assembly comprising spaced pairs of contact jaws for receiving the meter terminal posts, means connecting a line wire to one contact jaw of each pair and means connecting a load wire to the other contact jaw of each pair, a by-pass device comprising a load strap adjacent each pair of contact jaws, a by-pass link connected to each of said one contact jaws and normally disconnected from the load straps, means connecting each load strap to one of the load wires, and detachable wrenches for connecting each of said by-pass links to the corresponding load strap so as to by-pass current through the by-pass links and load straps from the line wires to the load wires.*

*12. In a ringless socket-block assembly for a socket-type meter, said socket-block assembly comprising spaced pairs of contact jaws for receiving the meter terminal posts, means connecting a line wire to one contact jaw of each pair and means connecting a load wire to the other contact jaw of each pair, a by-pass device comprising a load strap adjacent each pair of contact jaws, a by-pass link connected to each of said one contact jaws and normally disconnected from the load strap, an insulator interposed between each by-pass link and the corresponding load strap, a by-pass screw attached to each load strap and located through the corresponding insulator, means connecting each load strap to one of the load wires, and detachable means for engaging said by-pass screws and contacting said by-pass links so as to by-pass current through the by-pass links and load straps from the line wires to the load wires.*

*13. In a ringless socket-block assembly for a socket-type meter, said socket-block assembly comprising spaced pairs of contact jaws for receiving the meter terminal posts, means connecting a line wire to one contact jaw of each pair and means connecting a load wire to the other contact jaw of each pair, a by-pass device comprising a load strap adjacent each pair of contact jaws, a by-pass link connected to each of said one contact jaws and normally disconnected from the load straps, an insulator interposed between each by-pass link and the corresponding load strap, a by-pass screw attached to each load strap and located through the corresponding insulator, means connecting each load strap to one of the load wires, and detachable wrenches for engaging said by-pass screws and contacting said by-pass links so as to by-pass current through the by-pass links and load straps from the line wires to the load wires.*

*14. In a ringless socket-block assembly for a socket-type meter, said socket-block assembly comprising spaced pairs of contact jaws for receiving the meter terminal posts, means connecting a line wire to one contact jaw of each pair and means connecting a load wire to the other contact jaw of each pair, a by-pass device comprising a load strap adjacent each pair of contact jaws, a by-pass link connected to each of said one contact jaws and normally disconnected from the load straps, an insulator interposed between each by-pass link and the corresponding load strap, a by-pass screw attached to each load strap and located through the corresponding insulator, means connecting each load strap to one of the load wires, and tools having threaded sockets for*

*engaging said by-pass screws and said tools having portions for simultaneously contacting said by-pass links so as to by-pass current through the by-pass links and load straps from the line wires to the load wires.*

References Cited in the file of this patent or the original patent

UNITED STATES PATENTS

| | | |
|---|---|---|
| 2,030,522 | Johansson | Feb. 11, 1936 |
| 2,036,039 | Grace | Mar. 31, 1936 |
| 2,066,024 | Winter | Dec. 29, 1936 |
| 2,126,602 | Bakke | Aug. 9, 1938 |
| 2,626,309 | Road et al. | Jan. 20, 1953 |
| 2,713,102 | Lavarack | July 12, 1955 |